(12) United States Patent
Updike

(10) Patent No.: US 10,495,244 B2
(45) Date of Patent: Dec. 3, 2019

(54) POSITIONALLY FIXED CLAMP AND A HOSE OR DUCT HAVING A POSITIONALLY FIXED CLAMP

(71) Applicant: MANN+HUMMEL GmbH, Ludwigsburg (DE)

(72) Inventor: Gregg Updike, Galesburg, MI (US)

(73) Assignee: MANN+HUMMEL GmbH, Ludwigsburg (DE)

( * ) Notice: Subject to any disclaimer, the term of this patent is extended or adjusted under 35 U.S.C. 154(b) by 170 days.

(21) Appl. No.: 15/681,402

(22) Filed: Aug. 20, 2017

(65) Prior Publication Data

US 2019/0056051 A1 Feb. 21, 2019

(51) Int. Cl.
| | |
|---|---|
| F16L 33/04 | (2006.01) |
| F16L 33/34 | (2006.01) |
| F16L 33/18 | (2006.01) |
| F16L 33/08 | (2006.01) |

(52) U.S. Cl.
CPC ............. *F16L 33/04* (2013.01); *F16L 33/08* (2013.01); *F16L 33/18* (2013.01); *F16L 33/34* (2013.01)

(58) Field of Classification Search
CPC ............ F16L 33/04; F16L 33/34; F16L 33/08
USPC .......................................................... 285/23
See application file for complete search history.

(56) References Cited

U.S. PATENT DOCUMENTS

| | | | | |
|---|---|---|---|---|
| 3,365,218 A | * | 1/1968 | Denyes ................. | F16L 33/04 24/19 |
| 3,389,442 A | * | 6/1968 | Tetzlaff ................. | F16L 33/10 285/252 |
| 3,454,996 A | * | 7/1969 | Tetzlaff ................. | F16L 33/04 24/283 |
| 3,477,106 A | * | 11/1969 | Tetzlaff ................. | F16L 33/04 24/279 |
| 5,185,913 A | * | 2/1993 | Campo ................. | F16L 33/03 24/283 |
| 5,456,784 A | * | 10/1995 | Cogdill ................. | F16L 33/03 156/229 |
| 5,820,166 A | | 10/1998 | Webb | |
| 5,915,739 A | * | 6/1999 | Cradduck ............. | F16L 33/03 285/114 |
| 6,343,772 B1 | * | 2/2002 | Oi ......................... | F16L 33/03 285/23 |
| 6,390,136 B1 | | 5/2002 | Hutchins et al. | |
| 6,398,265 B1 | * | 6/2002 | Sabo ..................... | F16L 33/08 285/23 |
| 6,530,609 B1 | * | 3/2003 | Chatterton ............ | F16L 33/03 285/23 |
| 6,701,581 B2 | * | 3/2004 | Senovich .............. | F16L 33/03 24/20 R |
| 6,824,169 B2 | * | 11/2004 | Coffman ............... | F16L 33/08 285/23 |
| 6,899,360 B1 | * | 5/2005 | Flynn ................... | F16L 33/02 285/252 |
| 6,942,253 B2 | | 9/2005 | Bowater | |
| 7,380,834 B2 | | 6/2008 | Smith et al. | |

(Continued)

*Primary Examiner* — David Bochna
(74) *Attorney, Agent, or Firm* — James Hasselbeck

(57) ABSTRACT

A hose or duct having and end with an adjustable clamp fixed in an enforced position thereon. The clamp includes a band which encircles the hose or duct. The band has an adjustable diameter operable to compress the hose or duct to form a fluid tight seal onto an exterior of a connection port. The adjustable clamp secured to the duct or hose by at least one mounting pad.

7 Claims, 2 Drawing Sheets

(56) References Cited

U.S. PATENT DOCUMENTS

| | | | | |
|---|---|---|---|---|
| 7,422,245 B2* | 9/2008 | Norman | ............. | F16L 33/08 |
| | | | | 285/23 |
| 7,490,862 B2* | 2/2009 | Sakazaki | ............. | F16L 33/03 |
| | | | | 24/274 R |
| 7,761,962 B2 | 7/2010 | Krauss | | |
| 7,896,400 B2 | 3/2011 | Brill et al. | | |
| 8,060,991 B2* | 11/2011 | Ryhman | ............. | F16L 33/08 |
| | | | | 285/23 |
| 8,607,421 B2* | 12/2013 | Col | ............. | F16L 33/08 |
| | | | | 285/23 |
| 8,607,422 B2* | 12/2013 | Mohan | ............. | F16L 33/08 |
| | | | | 285/23 |
| 9,267,629 B2 | 2/2016 | Miessmer | | |
| 9,447,903 B2 | 9/2016 | Bowater | | |
| 9,494,113 B2* | 11/2016 | Stec | ............. | F02M 35/10137 |
| 2002/0060453 A1* | 5/2002 | Spurgat | ............. | F16L 33/08 |
| | | | | 285/23 |
| 2004/0066033 A1* | 4/2004 | Rier | ............. | F16L 33/08 |
| | | | | 285/23 |
| 2004/0207195 A1* | 10/2004 | Bowater | ............. | F16L 33/08 |
| | | | | 285/23 |
| 2005/0052020 A1* | 3/2005 | Butler | ............. | F16L 33/08 |
| | | | | 285/23 |
| 2005/0099001 A1* | 5/2005 | Cassel | ............. | F16L 21/065 |
| | | | | 285/23 |
| 2007/0035122 A1* | 2/2007 | Smith | ............. | F16L 33/08 |
| | | | | 285/23 |
| 2009/0189389 A1* | 7/2009 | Brill | ............. | F16L 33/02 |
| | | | | 285/23 |

* cited by examiner

POSITIONALLY FIXED CLAMP AND A HOSE OR DUCT HAVING A POSITIONALLY FIXED CLAMP

TECHNICAL FIELD

The invention relates to hose or duct assemblies and, more particularly, to clamps positionally fixed onto a hose or duct and held in an enforced sealing alignment and adjustment accessible position on the hose or duct.

BACKGROUND

This section provides background information related to the present disclosure which is not necessarily prior art.

A hose or a duct may be used as a conduit to conduct liquids or gases between various components, for example, in automotive, truck or industrial applications. It is well known to use a hose clamp over an outer circumference of a hose or duct to compress the hose and seal to a connection port of another device.

To properly secure the hose or duct onto a connection port or fitting, the hose clamp is installed at a roughly judged longitudinal distance from the end of hose or duct, with the hope that this distance aligns the clamp with a sealing surface of a fitting on which the hose is attached. The clamp then compresses the hose or duct against the sealing surface on the connection port or fitting. However, enforcing this hose clamp alignment is difficult and error prone if done manually, possibly resulting in a compromised seal between the hose or duct and the connection port or fitting and/or a compromised mechanical connection.

Another problem arises in that the clamp may tend of rotate circumferentially about the hose or duct during adjustment and tightening, and in such cases, it may be impossible to adjust and tighten the clamp as contact with a tool may cause the clamp to rotate on the hose or duct or move away from the tool. Also, when an automated or robotic installation of the hose or duct is intended, or in applications where the clamp is accessible for adjustment only in certain radial orientations, the clamp may move out of position longitudinally along the duct or rotate circumferentially on the duct out of radial orientation, missing the sweet spot alignment to the sealing surface and thereby foiling attempts to achieved a fluid tight and mechanically fast connection.

In the art it is known to provide clamps having positioning members which extend axially and then bend over the connection end of a hose or duct to limit the axial movement on the clamp on the hose or duct. Such clamps may be equipped with a flat portion that extends on the outside of the hose in a longitudinal direction of the hose to an end of the hose. The flat portion extends over an axial end of the hose, thereby limiting longitudinal movement of the clamp away from the end of the hose. Such positioning members may permit the clamp to be positioned nearer to the connecting end of the hose or duct than is preferred, resulting in a misalignment with respect to the sealing surface of the connection port or fitting, or possibly allowing the clamp to slide off the hose at the connection end.

In other known art, U.S. Pat. No. 7,896,400 B2 teaches a flat positioning portion extending to bend over the end of the hose. In some embodiments, the positioning portion then embeds into the material of the hose at the connection end of the hose. In other embodiments, the positioning portion is bent again to lie against the radially interior surface of the hose. In some cases, a crimp tab is provided on the positioning portion which embeds into the inner surface to position the clamp on the hose. Such positioning members may permit the clamp to be positioned nearer to the end of the hose or duct than is preferred, resulting in a misalignment with respect to the sealing surface of the connection port or fitting.

A problem has been observed with clamps having a flat positioning portion that extends over the end of the hose and bends to lie against the interior of the hose. In such cases, the positioning portion or the crimp tabs may scratch the inner surface of the hose or duct or scratch the outer surface of the connection port or fitting, resulting in a localized surface damage that is difficult to seal or prone to leaks.

Problems may arise in prior art clamps in that the clamp, in some configurations, is not uniquely fixed into a rotational position on the hose or duct and may be rotated arbitrarily about the hose or duct when installed onto the hose or duct. In these cases, an enforced radial alignment of hose clamp on the hose or duct is not provided, allowing the clamp to rotate out of position where it cannot be reached and tightened.

Another problem may arise from prior art clamp positioning members which include crimp tabs. The crimp tabs embed into the wall of the hose or duct and thereby may completely puncture the wall or weaken the wall of the hose or duct, compromising the hose or duct by forming a source of mechanical hose or duct wall failure and leaks.

Yet another problem is observed that needs resolution. With clamps having a positioning portion that extends over the hose end and into the interior of the hose to engage against the inner wall or embed into the end of the hose, in this case, when the hose is not installed on the connection portion, the stiffness of the clamp tends to distort the shape of the hose, for example, changing the shape of an end of the hose from a circle to an oval so the shape is no longer matched to the shape of the connection port onto which the hose or duct is to mount. This is particularly problematic with automated or robotic installations, but also for manual installations. The hose or duct, when so deformed in shape, may not be readily received over the connection port or fitting, or may not fit at all, resulting in extra manual work and wasteful time lost in assembling the connection.

In other cases, it is desired to locate the clamp at or within a very short distance from the end of the hose or duct. In such cases, it is problematic as the clamp may freely move off the connection end of the hose or duct during assembly, resulting in a connection failure.

SUMMARY

This section provides a general summary of the disclosure, and is not a comprehensive disclosure of its full scope or all of its features.

An object of the invention is to provide a positionally fixed clamp for a hose or duct that overcomes the problems and limitations of the prior art, particularly the problems as discussed in the background section above.

Disclosed is a positionally fixed adjustable clamp for a hose or duct having a circumferential band with an adjustable diameter, the clamp adapted for mounting on a radially outer circumferential surface of a duct or hose to compressibly secure the duct or hose to a connection port or fitting of another device. The positionally fixed adjustable clamp has at least one position fixing leg, each position fixing leg projecting in a longitudinal direction outwardly from the positionally fixed adjustable clamp.

The positionally fixed adjustable clamp may be arranged on and fixedly mounted to a hose or duct. The hose or duct may be made of a rubber or plastic material, although other materials such as: various metals, fiberglass, resin materials, as well as other materials as would be known to those skilled in the art.

In some aspects of the invention, the adjustable ring shaped clamp is arranged on and closes about an outer circumference of the hose or duct. The adjustable ring shaped clamp is positioned at a fixed radial position on the outer circumferential surface and at a fixed longitudinal spacing from a connecting end of the hose or duct.

In some aspects of the invention, a first mounting pad is securely fixed onto the outer surface of the hose or duct, the first mounting pad is securely fixed onto the at least one position fixing leg thereby fixing the rotational position and longitudinal spacing adjustable ring shaped clamp on the hose or duct.

In some aspects of the invention, a second mounting pad may be securely fixed onto the outer circumferential surface of the hose or duct, the second mounting pad securely fixed onto the adjustable ring shaped clamp, fixing the rotational position and longitudinal spacing adjustable ring shaped clamp on the hose or duct. The first mounting pad and the second mounting pad are preferably spaced apart in a longitudinal direction and aligned longitudinally; the longitudinal direction is the longitudinal direction of the house or duct. The first and/or second mounting pads may be made of an elastic rubber material or plastics.

In some aspects of the invention, the mounting pads may be permanently secured to the hose or duct by vulcanization, or may be permanently welded onto the hose or duct.

In some aspects of the invention, a position fixing band is provided, having at least one T-shaped portion. The T-shaped portion of the position fixing band is arranged on a radially inner surface or arranged on a radially outer surface of the circumferential band of the ring shaped clamp or, in other aspects, may be formed in one piece with the clamp. The head portion may engage with and positionally lock the position fixing band to the adjustable ring shaped clamp. At least one position fixing leg may be formed by the at least one T-shaped portion of the position fixing band, the at least one position fixing leg projecting in a longitudinal direction outwardly from the head portion and the adjustable ring shaped clamp. The position fixing band is preferably a metallic band elongated on and conforms to an arcuate shape of the radially outer surface or the radially inner surface of the adjustable ring shaped clamp. Preferably the position fixing band is permanently secured onto the circumferential band of the clamp by spot welds or by rivets.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

Figure 1:
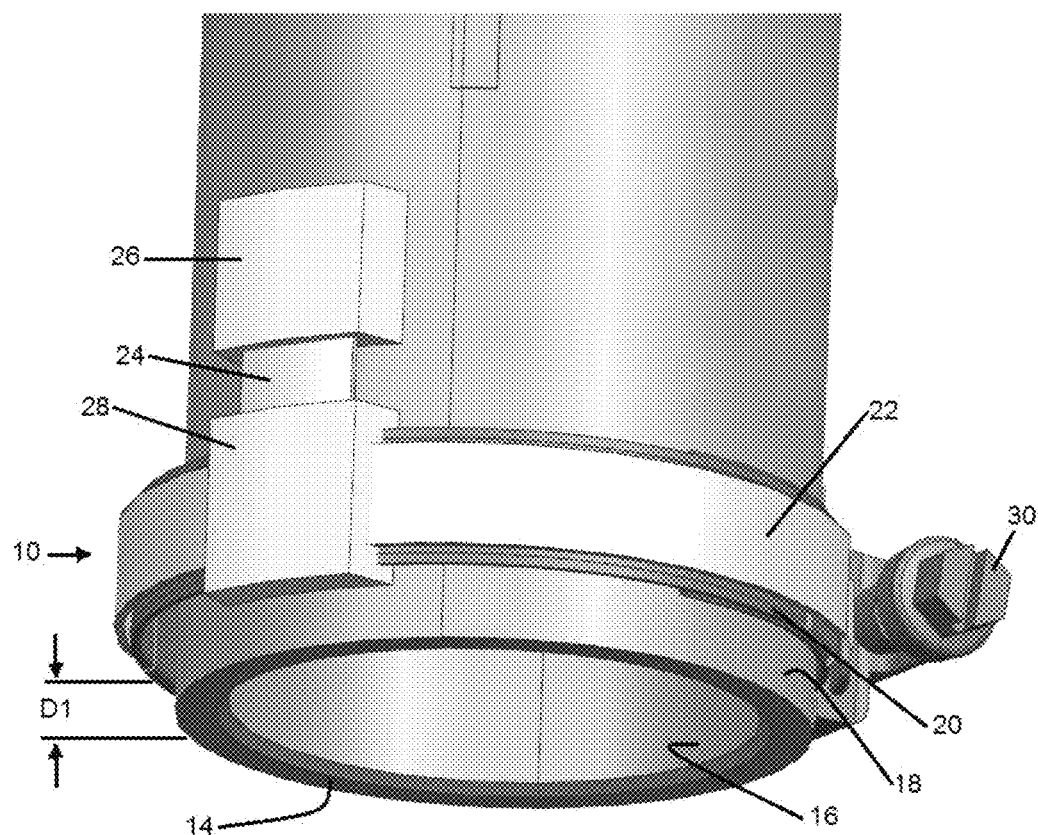
FIG. 1 is a perspective side view of a hose or duct having a positionally fixed clamp secured thereon, consistent with the present inventive disclosure.
Figure 2:
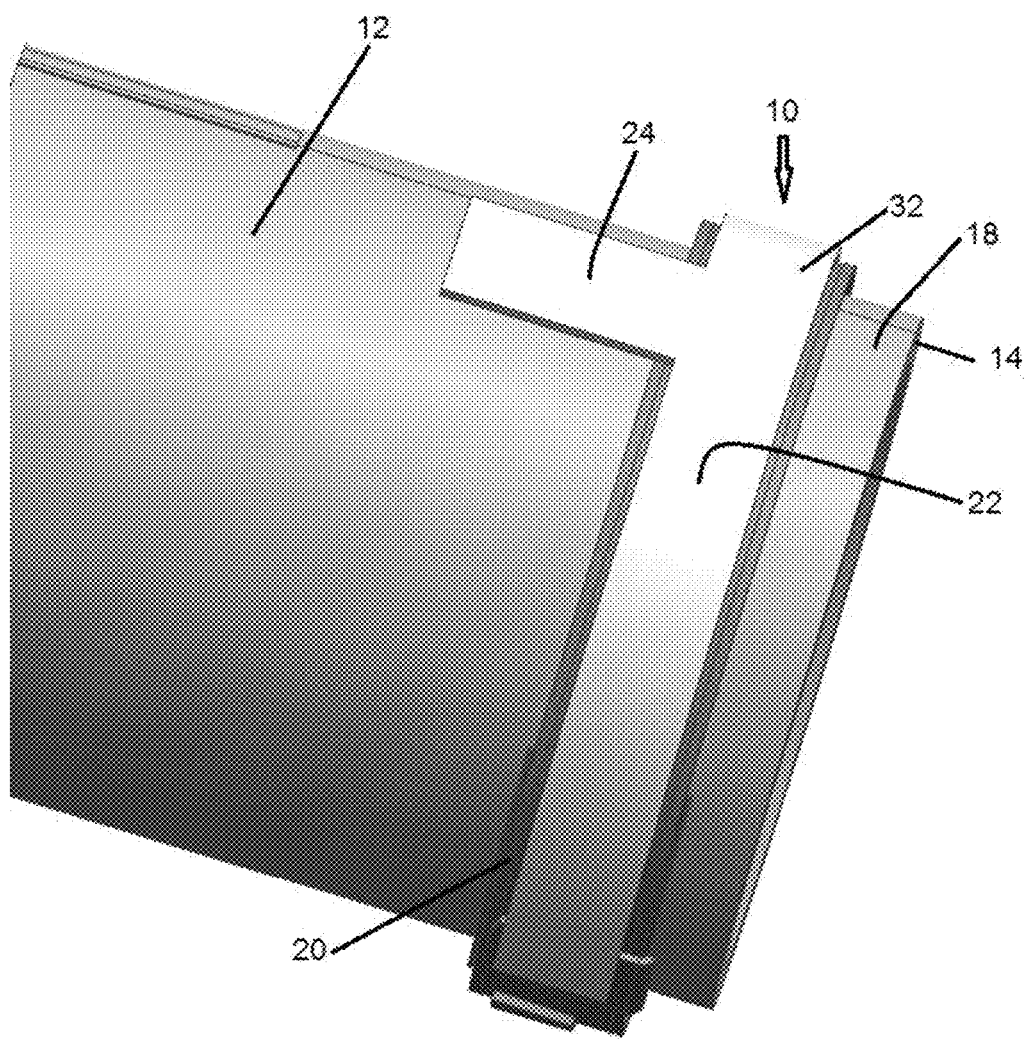
FIG. 2 is a perspective side view of a hose or duct having a positionally fixed clamp arranged thereon, consistent with the present inventive disclosure.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Example embodiments will now be described more fully with reference to the accompanying drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 shows a perspective side view of a hose or duct 12 having a positionally fixed clamp 10 secured thereon and held in an enforced sealing alignment and adjustment accessible position on the hose or duct, consistent with the present inventive disclosure. The positionally fixed clamp 10 having the hose or duct 12 may advantageously be applied to conduct fluid or gases, such as (for example) intake air into an internal combustion engine, as well as many other fluid conduction applications such as are readily known to those of ordinary skill in the art. The hose or duct 12 may, for example, be realized as an injection molded plastic duct or a blow molded plastic duct. Preferably the duct or hose is at least somewhat compressible and preferably at least somewhat elastic. The hose or duct 12 may, in some cases, be realized as an elastomeric or rubber hose.

The positionally fixed clamp 10 is arranged on and closes about an outer circumference of an end of the hose or duct 12, arranged to operably compress the hose onto a connection port or a connection fitting of another device (not shown), thereby mechanically mounting and compressively sealing the hose or duct 12 onto the connection port or connection fitting such that fluids or gases do not escape to the external environment.

To properly secure the hose or duct 12 onto a connection port or fitting, the positionally fixed clamp 10 is preferably positioned on the hose or duct 12 at a preferred or optimal longitudunal distance D1 from the connection end 14 of hose or duct 12. This distance preferably aligns the positionally fixed clamp 10 radially and longitudinally over a sealing surface of the connection port or a connection fitting, such that when the clamp is adjusted (see adjusting member 30) to reduce the clamp diameter, the hose or duct 12 experiences a radially inwardly acting compressive force from the clamp, compressing the hose or duct against a sealing surface provided on the connection port or fitting. Enforcing this hose clamp alignment over the sealing surface is difficult and error prone if done manually, possibly resulting in a compromised seal between the hose or duct and the connection port or fitting and/or a compromised mechanical connection.

The positionally fixed clamp 10 solves another problem of earlier state of the art clamps in which such prior art clamps may tend to slide or to rotate circumferentially on the hose or duct during adjustment and tightening of the clamp. For example, when an automated or robotic installation of the hose or duct is intended, or in applications where the clamp is accessible for adjustment only in certain radial orientations during assembly (perhaps due to presence of other obstructing components), the clamp may problematically move out of position longitudinally along the duct and/or rotate circumferentially on the duct out of the required radial orientation, thereby foiling any attempt to achieved a fluid tight connection.

Advantageously, the positionally fixed clamp 10 is arranged on the radially outer circumferential surface 18 of the hose or duct 12, and is arranged at an intended longitudinal offset distance D1 from the connection end 14 of the hose or duct 12, so as to assure alignment with a sealing surface of the connection port or fitting when installed. According to the inventive disclosure, the clamp 10 is positionally fixed onto the outer surface 18 of the hose or duct 12 in a fixed longitudinal offset distance D1 from the connection end 14 and rotationally fixed on the outer circumference of the hose our duct 12 in a fix rotational position (i.e., not rotatable about the outer circumference of the hose or duct 12). This configuration is considered advantageous to forming a good seal and mechanical connection. The rotation and longitudinal position of the positionally fixed clamp 10 may be fixed in position by one or more mounting pads (26, 28) which may firmly and permanently secure the positionally fixed clamp 10 onto the radially outer circumferential surface 18.

The positionally fixed clamp 10 includes an adjustable ring shaped clamp 20 having a circumferential band having an adjustable diameter. The adjustable diameter may be adjusted by various means, in some embodiments, by the adjustment member 30 such as a screw. The screw has threads that may engage into slits or ribs formed in the circumferential band to urge the circumferential band to circumferentially shorten or elongate, thereby adjusting the radially compressive force applied onto the circumferential outer surface of the hose or duct 12.

The positionally fixed clamp 10 includes at least one and possibly multiple position fixing legs 24, each leg projecting in a longitudinal direction (of the hose or duct) outwardly from the circumferential band, arranged over lying directly on the circumferential outer surface 18 of the hose or duct 12. The at least one position fixing leg 24 may, in some embodiments, be formed on or by the adjustable circumferential clamp band 20 of the positionally fixed clamp 10.

In other embodiments, a positional fixing band 22 is provided. The position fixing band 22 having one or more T-shaped portions (24 with 22) may be provided on a radially inner surface or on a radially outer surface of the adjustable circumferential band 20 of the ring shaped clamp 10. A head portion 32 of the T-shaped portion is arranged on a radially inner surface or on a radially outer surface of the circumferential band 20. The head portion 32 is arranged on and engages with and positionally locks the position fixing band 22 onto the adjustable ring shaped clamp 20. Preferably the position fixing band 22 is a dimensionally rigid, curved metal band, preferably a stainless steel band. The position fixing band extends on and conforms to a shape of the outer circumferential surface or inner circumferential surface of the adjustable ring shaped clamp band 20. The head portion 32 is longated to lie and extend in the circumferential direction of the adjustable ring shaped clamp band 20. The position fixing band 22 is preferably permanently secured onto the outer circumferential surface or alternately the inner circumferential surface of the circumferential band 20. The securing may be provided by spot welds or by rivets.

Preferably the hose or duct 12 is made of a rubber or plastic material, although the material selection here is preferable and not limiting. The hose or duct 12 has a connecting end 14 configured for sealably connecting to a connection port or fitting (not shown) of another device. The hose or duct 12 has a radially inner surface 16 and a radially outer circumferential surface 18. The hose or duct 12 is preferably tubular.

The adjustable ring shaped clamp 20 is arranged on and closing about an outer circumference of the hose or duct 12, the adjustable ring shaped clamp 20 is positioned at a desired or optimal radial position on the outer circumferential surface 18 and at a desired or optimal longitudinal spacing D1 from the connecting end 14 of the hose or duct 12.

As shown in FIG. 1, a first mounting pad 26 is securely fixed onto the outer surface of the hose or duct 12, the first mounting pad 26 is also securely fixed onto the at least one position fixing leg 24, fixing the rotational position and longitudinal spacing of the positionally fixed clamp on the hose or duct 12. A second mounting pad 28 may be provided and may be securely fixed onto the outer circumferential surface 18 of the hose or duct 12. The second mounting pad 28 is securely fixed onto the adjustable ring shaped clamp and position fixing band 22 (if provided), fixing the rotational position and longitudinal spacing of the positionally fixed clamp on the hose or duct 12. As shown in FIG. 1, the first mounting pad 26 and the second mounting pad 28 are spaced apart in a longitudinal direction of the hose or duct 12 and aligned longitudinally in parallel with the longitudinal direction so as to fix the longitudinal position and the rotational position of the positionally fixed clamp on the duct or hose 12.

Preferably, the first mounting pad 26 is a rubber or plastic pad that may surround and encapsulate a portion of the at least one position fixing leg 24. Alternately, the first mounting pad 26 together with the hose or duct may surround the at least one position fixing leg 24.

The second mounting pad 28 extends in a longitudinal direction across and covers an outer portion of the adjustable ring shaped clamp 20. Preferably the mounting pads 26, 28 are permanently secured onto the hose or duct by vulcanization, or permanently welded onto the hose or duct 12. The mounting pads may be substantially rectangular.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, or section discussed below could be termed a second element, component, region, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A positionally fixed clamp for a hose or duct, the positionally fixed clamp comprising:
an adjustable ring shaped clamp having a circumferential band having an adjustable diameter, the clamp adapted for mounting on an radially outer circumferential surface of a duct or hose to compressibly secure the duct or hose to a connection port or fitting;
a position fixing band having at least one T-shaped portion, including:
a head portion of the T-shaped portion, the head portion arranged on a radially inner surface or arranged on a radially outer surface of the circumferential band of the ring shaped clamp,
wherein the head portion engages with and positionally locks the position fixing band to the adjustable ring shaped clamp;
at least one position fixing leg, each leg formed by the at least one T-shaped portion of the position fixing band, the at least one position fixing leg projecting in a longitudinal direction outwardly from the head portion and the adjustable ring shaped clamp;
wherein the position fixing band is elongated on and conforms to an arcuate shape of the radially outer surface or the radially inner surface of the adjustable ring shaped clamp;
wherein the position fixing band is permanently secured onto the circumferential band of the clamp by spot welds or by rivets;
further comprising:
the hose or duct of a rubber or plastic material, the hose or duct having:
a connecting end for sealably connecting to a connection port or fitting;
a radially inner surface;
a radially outer circumferential surface;
wherein the adjustable ring shaped clamp is arranged on closing about an outer circumference of the hose or duct, the adjustable ring shaped clamp positioned at a fixed radial position on the outer circumferential surface and at a fixed longitudinal spacing from the connecting end;
a first mounting pad securely fixed onto the outer surface of the hose or duct, the first mounting pad securely fixed onto the at least one position fixing leg, fixing the rotational position and longitudinal spacing of the adjustable ring shaped clamp on the hose or duct.

2. The positionally fixed adjustable clamp according to claim 1, further comprising:
a second mounting pad securely fixed onto the outer circumferential surface of the hose or duct, the second mounting pad securely fixed onto the adjustable ring shaped clamp, fixing the rotational position and longitudinal spacing adjustable ring shaped clamp on the hose or duct,
wherein the first mounting pad and the second mounting pad are spaced apart in a longitudinal direction and aligned longitudinally.

3. The positionally fixed adjustable clamp according to claim 2, wherein
the first mounting pad, together with the hose or duct, surrounds and encapsulates a portion of the at least one position fixing leg; and
the second mounting pad extends in a longitudinal direction across and covers a radially outer portion of the adjustable ring shaped clamp.

4. The positionally fixed adjustable clamp according to claim 2, wherein
the first and second mounting pads are rubber pads or plastic pads;

wherein the mounting pads are permanently secured to the hose or duct by vulcanization, or permanently welded onto the hose or duct.

5. A positionally fixed clamp for a hose or duct, the positionally fixed clamp comprising:
   an adjustable ring shaped clamp having a circumferential band having an adjustable diameter, the clamp adapted for mounting on an radially outer circumferential surface of a duct or hose to compressibly secure the duct or hose to a connection port or fitting;
   the circumferential band having at least one T-shaped portion, including:
      at least one position fixing leg, each position fixing leg formed by the circumferential band, the at least one position fixing leg projecting in a longitudinal direction outwardly from the circumferential band;
   further comprising:
      the hose or duct of a rubber or plastic material, the hose or duct having:
         a connecting end for sealably connecting to a connection port or fitting;
         a radially inner surface;
         a radially outer circumferential surface;
      wherein the adjustable ring shaped clamp is arranged on and closing about an outer circumference of the hose or duct, the adjustable ring shaped clamp positioned at a fixed radial position on the outer circumferential surface and at a fixed longitudinal spacing from the connecting end;
      a first mounting pad securely fixed onto the outer surface of the hose or duct, the first mounting pad securely fixed onto the at least one position fixing leg, fixing the rotational position and longitudinal spacing adjustable ring shaped clamp on the hose or duct;
      a second mounting pad securely fixed onto the outer circumferential surface of the hose or duct, the second mounting pad securely fixed onto the adjustable ring shaped clamp, fixing the rotational position and longitudinal spacing adjustable ring shaped clamp on the hose or duct;
      wherein the first mounting pad and the second mounting pad are spaced apart in a longitudinal direction and aligned longitudinally.

6. The positionally fixed adjustable clamp according to claim 5, wherein
   the first mounting pad, together with the duct or hose, surrounds and encapsulates a portion of the at least one position fixing leg; and
   the second mounting pad extends in a longitudinal direction across and covers a radially outer portion of the adjustable ring shaped clamp.

7. The positionally fixed adjustable clamp according to claim 5, wherein
   the first and second mounting pads are rubber pads or plastic pads;
   wherein the mounting pads are permanently secured to the hose or duct by vulcanization, or permanently welded onto the hose or duct.

* * * * *